United States Patent
Eriksson

(10) Patent No.: US 11,075,684 B2
(45) Date of Patent: Jul. 27, 2021

(54) METHOD AND APPARATUS FOR ESTIMATING CHANNEL QUALITY

(71) Applicant: Telefonaktiebolaget LM Ericsson (publ), Stockholm (SE)

(72) Inventor: Erik Eriksson, Linkoping (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/970,922

(22) PCT Filed: Feb. 23, 2018

(86) PCT No.: PCT/EP2018/054546
§ 371 (c)(1),
(2) Date: Aug. 18, 2020

(87) PCT Pub. No.: WO2019/161918
PCT Pub. Date: Aug. 29, 2019

(65) Prior Publication Data
US 2020/0395995 A1     Dec. 17, 2020

(51) Int. Cl.
*H04B 7/02* (2018.01)
*H04B 7/08* (2006.01)
*H04B 7/06* (2006.01)

(52) U.S. Cl.
CPC ........... *H04B 7/086* (2013.01); *H04B 7/0617* (2013.01); *H04B 7/0632* (2013.01)

(58) Field of Classification Search
CPC ..... H04B 7/086; H04B 7/0617; H04B 7/0632
(Continued)

(56) References Cited

U.S. PATENT DOCUMENTS

2018/0323846 A1* 11/2018 Tsai .................... H04B 7/0626

FOREIGN PATENT DOCUMENTS

WO     2018009462 A1     1/2018

OTHER PUBLICATIONS

PCT International Search Report, dated Jan. 14, 2019, in connection with International Application No. PCT/EP2018/054546, all pages.
(Continued)

*Primary Examiner* — Zewdu A Kassa
(74) *Attorney, Agent, or Firm* — Leffler Intellectual Property Law, PLLC

(57) ABSTRACT

A method of estimating a channel quality of an uplink channel from a user equipment comprises receiving a measurement report from a user equipment, wherein the measurement report is based on at least one measurement made by the user equipment on a first downlink reference signal previously transmitted to the user equipment using a first downlink beamformer and at least one measurement made by the user equipment on a second downlink reference signal previously transmitted to the user equipment using a second downlink beamformer. The method comprises acquiring an estimate of a channel quality of a first uplink channel from the user equipment, in which a first uplink beamformer has been used to transmit a first uplink signal on the first uplink channel. The method comprises determining at least one transmission parameter for a future second uplink channel from the user equipment, in which a second uplink beamformer is to be used to transmit on the second uplink channel, wherein the at least one transmission parameter is determined based on the received measurement report and the acquired estimate of the channel quality of the first uplink channel.

16 Claims, 13 Drawing Sheets

(58) Field of Classification Search
 USPC .............. 375/267, 260, 259, 219, 295, 316
 See application file for complete search history.

(56) References Cited

OTHER PUBLICATIONS

PCT Written Opinion, dated Jan. 14, 2019, in connection with International Application No. PCT/EP2018/054546, all pages.

* cited by examiner

METHOD AND APPARATUS FOR ESTIMATING CHANNEL QUALITY

TECHNICAL FIELD

Embodiments described herein relate to methods and apparatus for estimating channel quality. For example, the embodiments may relate to estimating channel quality in a network node such as an analogue receiver.

BACKGROUND

The $5^{th}$ Generation (5G) radio network standard is expected to support both digital and analogue radio implementations. In an analogue radio receiver a phase-shift is added to each antenna branch before analogue to digital conversion. This may reduce complexity and cost since fewer digital chains are needed. A drawback compared to digital beamforming is that, at a given time instance, only a single beamformer (set of phase-shifts) can be evaluated.

When selecting transmission parameters for an uplink transmission, for example transmission parameters such as modulation and coding, an estimate of the channel quality is needed. This estimate is typically acquired through measurements of signals sent from a user equipment, UE. With uplink analogue receivers only a single beamformer at a time can be evaluated. Sometimes the network wants to change the beamformer for a given UE, e.g. based on reports from the UE or due to co-scheduling with other users. In these cases the network does not have any valid measurement on which to base uplink transmissions parameters for the new beamformer.

SUMMARY

According to one aspect there is provided a method of estimating a channel quality of an uplink channel from a user equipment. The method comprises receiving a measurement report from a user equipment, wherein the measurement report is based on at least one measurement made by the user equipment on a first downlink reference signal previously transmitted to the user equipment using a first downlink beamformer and at least one measurement made by the user equipment on a second downlink reference signal previously transmitted to the user equipment using a second downlink beamformer. The method comprises acquiring an estimate of a channel quality of a first uplink channel from the user equipment, in which a first uplink beamformer has been used to transmit a first uplink signal on the first uplink channel. The method comprises determining at least one transmission parameter for a future second uplink channel from the user equipment, in which a second uplink beamformer is to be used to transmit on the second uplink channel, wherein the at least one transmission parameter is determined based on the received measurement report and the acquired estimate of the channel quality of the first uplink channel.

According to another aspect there is provided a network node comprising a processor and a memory, said memory containing instructions executable by said processor. The network node is operative to receive a measurement report from a user equipment, wherein the measurement report is based on at least one measurement made by the user equipment on a first downlink reference signal previously transmitted to the user equipment using a first downlink beamformer and at least one measurement made by the user equipment on a second downlink reference signal previously transmitted to the user equipment using a second downlink beamformer. The network node is operative to acquire an estimate of a channel quality of a first uplink channel from the user equipment, in which a first uplink beamformer has been used to transmit a first uplink signal on the first uplink channel. The network node is operative to determine at least one transmission parameter for a future second uplink channel from the user equipment, in which a second uplink beamformer is to be used to transmit on the second uplink channel, based on the received measurement report and the acquired estimate of the channel quality of the first uplink channel.

According to another aspect there is provided a method in a user equipment. The method comprises receiving a first reference signal from a network node in a first downlink channel using a first downlink beamformer profile, and receiving a second reference signal from the network node in a second downlink channel using a second downlink beamformer profile. The method comprises performing one or more measurements on the received first reference signal and a corresponding one or more measurements on the received second reference signal. The method comprises transmitting a measurement report to the network node, for use by the network node in determining at least one transmission parameter for a future second uplink channel from the user equipment, in which a second uplink beamformer is to be used to transmit on the second uplink channel, based on the transmitted measurement report and an acquired estimate of the channel quality of a first uplink channel from the user equipment to the network node.

According to another aspect there is provided a user equipment comprising a processor and a memory, said memory containing instructions executable by said processor. The user equipment is operative to receive a first reference signal from a network node in a first downlink channel using a first downlink beamformer profile, and receive a second reference signal from the network node in a second downlink channel using a second downlink beamformer profile. The user equipment is operative to perform one or more measurements on the received first reference signal and a corresponding one or more measurements on the received second reference signal. The user equipment is operative to transmit a measurement report to the network node, for use by the network node in determining at least one transmission parameter for a future second uplink channel from the user equipment, in which a second uplink beamformer is to be used to transmit on the second uplink channel, based on the transmitted measurement report and an acquired estimate of the channel quality of a first uplink channel from the user equipment to the network node.

According to another aspect, there is provided a computer program comprising instructions which, when executed on at least one processor, cause the at least one processor to carry out the method according to any one of the embodiments described herein, and as defined in the appended claims.

According to another aspect there is provided a computer program product comprising a computer-readable medium with the computer program as described above.

DETAILED DESCRIPTION

Figure 1:
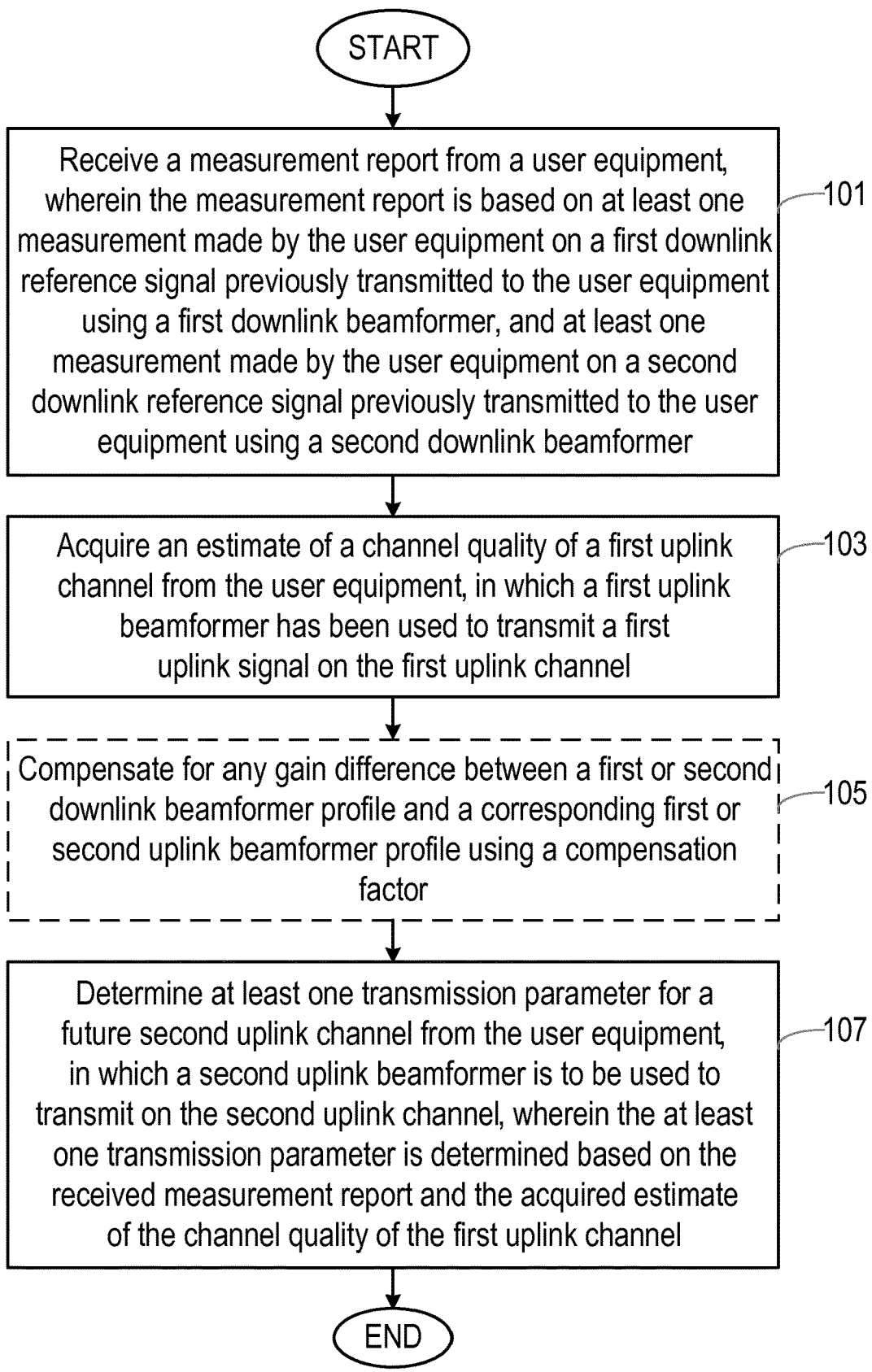
FIG. 1 illustrates an example of a flow chart relating to a method according to an embodiment.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analogue and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

As will be described below, embodiments disclosed herein relate to estimating a channel quality of an uplink using, for example, some difference or correlation between first and second beamformers used for transmitting in the downlink, for example some difference or correlation in quality, which is reported by a user equipment, to estimate the quality of the uplink using one of the beamformers based on the quality of the other beamformer and said difference or correlation in quality.

FIG. 1 shows an example of a method according to an embodiment, for estimating a channel quality of an uplink channel from a user equipment. The method may be performed, for example, in a network node such as a gNB, although it is noted that the steps may be performed in another node. It is also noted that one or more of the steps may be performed in one or more other nodes, including cloud nodes.

The method comprises receiving a measurement report, $REP_{AB}$, from a user equipment. The measurement report is based on at least one measurement made by the user equipment on a first downlink reference signal, Pilot A, previously transmitted to the user equipment using a first downlink beamformer (for example a first downlink beamformer having beamforming weights Pa_dl) and at least one measurement made by the user equipment on a second downlink reference signal, Pilot B, previously transmitted to the user equipment using a second downlink beamformer (for example a second beamformer having beamforming weights Pb_dl), step 101. The beamformer weights may comprise, for example, different phase shifts and/or amplitude for different antenna elements of the beamformers.

The method comprises acquiring an estimate of a channel quality of a first uplink channel from the user equipment, in which a first uplink beamformer, e.g. a beamformer having beamforming weights Paul, has been used to transmit a first uplink signal on the first uplink channel, step 103.

The method comprises determining at least one transmission parameter for a future second uplink channel from the user equipment, in which a second uplink beamformer, e.g. a beamformer having beamforming weights Pb_ul, is to be used to transmit on the second uplink channel. The at least one transmission parameter is determined based on the received measurement report and the acquired estimate of the channel quality of the first uplink channel, step 107.

As will be described in further detail later, in some embodiments the method of FIG. 1 may comprise an optional step of compensating for any gain or other difference between a first or second downlink beamformer profile and a corresponding first or second uplink beamformer profile using a compensating factor.

Thus, by taking measurements on the downlink for first and second beamformers, these can be used to determine at least one transmission parameter, for example by estimating a channel quality on an uplink using measurements on just one of the uplink beamformers.

Therefore, in an uplink analogue receiver where only a single beamformer at a time can be evaluated, the embodiments herein enable a network to change the beamformer for a given UE, without necessarily having any valid measurement on which to base uplink transmissions for the new beamformer. Instead, an estimation is made using measurements made on a first current uplink that uses a first beamformer, and a measurement report $REP_{AB}$ received from the UE, to then determine at least one transmission parameter for a future second uplink that uses a second beamformer.

The step of determining at least one transmission parameter may comprise estimating an expected channel quality of the second uplink channel from the user equipment, e.g. whereby this estimation is then used to determine the at least one transmission parameter.

In some examples the measurement report, $REP_{AB}$, is based on a comparison of a measurement made on the first reference signal transmitted using the first downlink beamformer with a corresponding measurement made on the second reference signal transmitted using the second downlink beamformer. The comparison may comprise, for example, determining a difference value between a particular measurement, or measurements.

Figure 2:
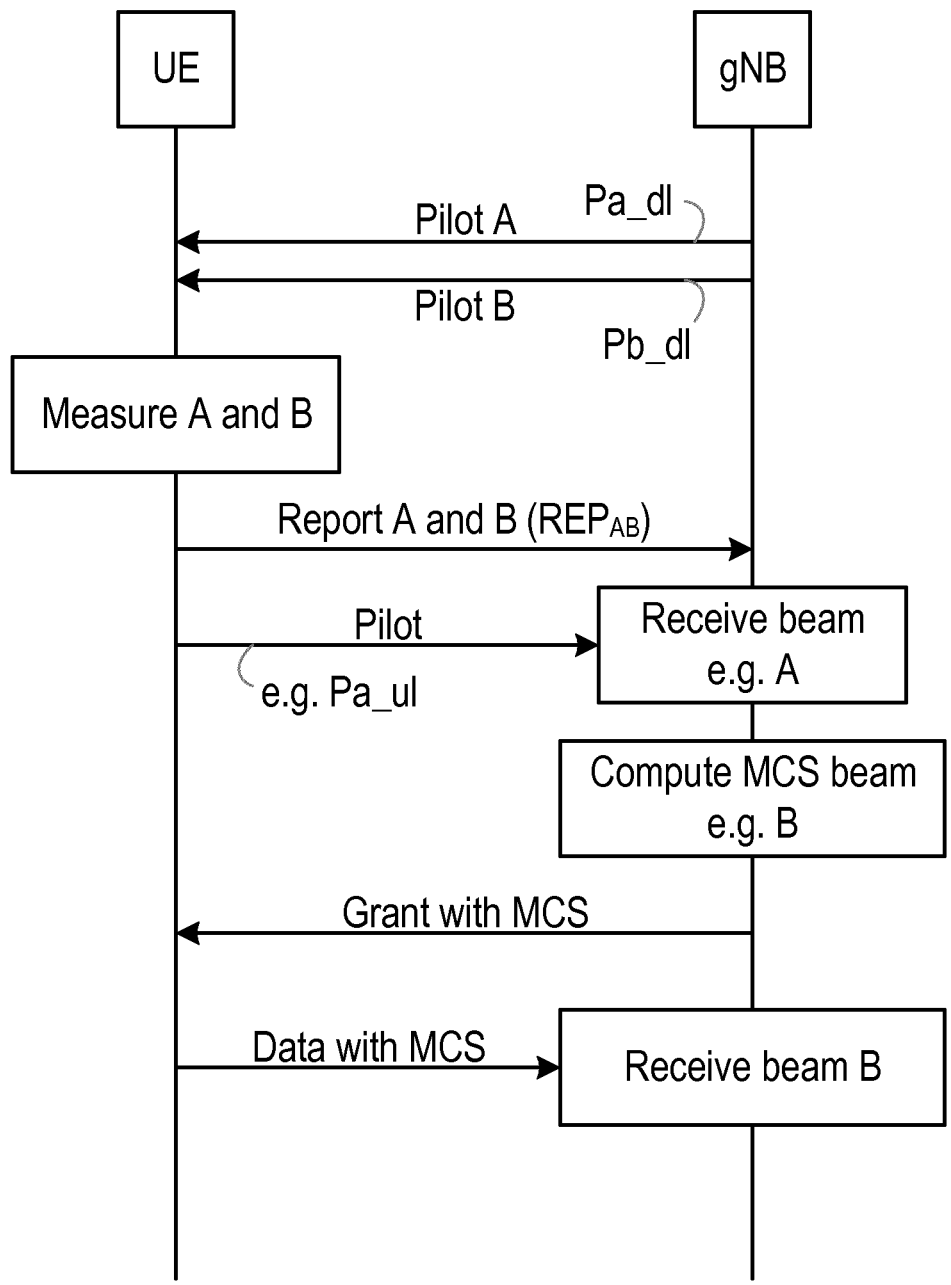
FIG. 2 shows an example of a signalling diagram, illustrating an example of communication between a user equipment and a network node according to an embodiment.

FIG. 2 shows an example of a signalling diagram, illustrating an example of communication between a user equipment, UE, and a network node, for example a gNB, according to an embodiment.

The gNB, transmits first and second downlink reference signals, Pilot A and Pilot B respectively, to a UE using first and second downlink beamformers having respective first and second, for example different, beamforming weights Pa_dl, Pb_dl. It is noted that the first and second downlink reference signals, Pilot A and Pilot B, may be transmitted in any order, or simultaneously.

The UE then performs measurements on said first and second downlink reference signals Pilot A, Pilot B. For example the UE performs at least one measurement on the first downlink reference signal, Pilot A, previously transmitted to the user equipment using the first downlink beamformer (for example a first downlink beamformer having beamforming weights Pa_dl) and at least one measurement on a second downlink reference signal, Pilot B, previously transmitted to the user equipment using the second downlink beamformer (for example a second beamformer having beamforming weights Pb_dl).

The UE feeds back or reports a measurement report, $REP_{AB}$, for example a quality measure to the gNB.

The measure may, for example, comprise a channel quality indicator, CQI, measurement and/or a reference signal received power, RSRP, measurement. The gNB receives the measurements from the UE. In one example, a comparison or correlation is made between the measurements on A and B at the UE, with the UE sending a comparison or correlation signal, or some difference parameter, to the gNB. In other examples, the UE sends the measurements relating to A and B to the gNB, e.g. two independent measurement reports over the air, with the comparison or correlation being carried out at the gNB. The comparison or correlation between measurements A and B may also be carried out, either partly or wholly, at some other network node, for example a cloud based node.

The gNB also acquires an estimate of a first uplink channel to said UE for one set of beamforming weights, for example beamforming weights Paul, on a first uplink signal transmitted from the UE. The first uplink signal may comprise, for example, an uplink sounding signal, a physical random access channel preamble signal, or a demodulation pilot sent from the UE.

The gNB is then able to determine at least one transmission parameter for the UE, for example modulation and coding, MCS, parameters, rank or transmit power, based on the measurement in the first uplink and the reported quality from the UE.

The gNB then sends the at least one transmission parameter to the UE, shown as a Grant with MSC, and receives a signal using said at least one transmission parameter using a second set of beamforming weights, for example Pb_ul, compared to the use used for estimating the first uplink channel, Pa_ul.

In some embodiments the two downlink beamformers are substantially the same as the two uplink receiver beamformers, or very similar, e.g. Pa_di=Pa_ul, Pb_di=Pb_ul.

In some embodiments there is a relation between the two sets of beamformers, for example all beams are directional beams but one of the beams is a wider beam containing the same direction as the corresponding uplink beam, e.g. Pa_dl being a wide beam with a gain X in the main direction Paul, Pb_dl=Pb_ul.

FIGS. 3A, 3B, 4A and 4B will now be used to describe some examples of different beamformer relationships.

Figure 3B:
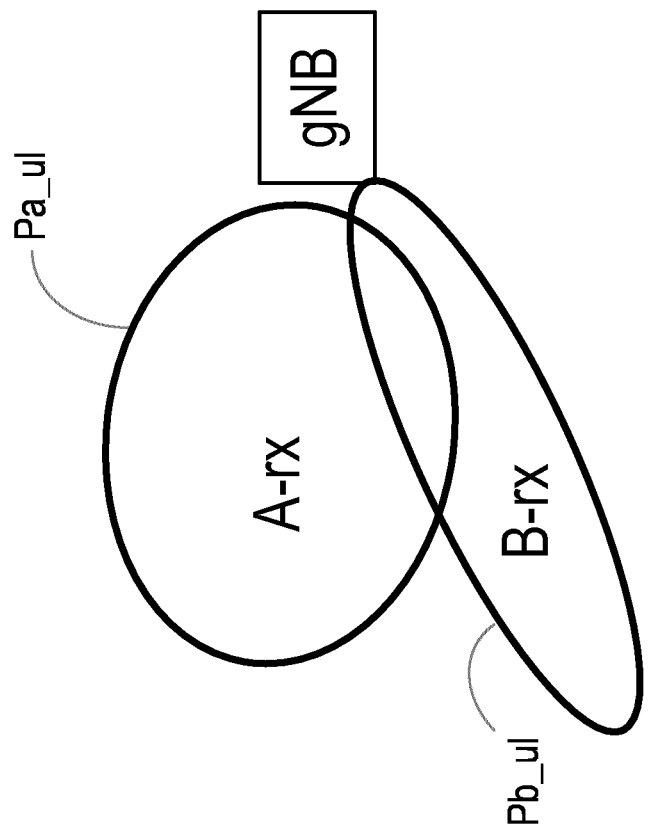
FIG. 3B shows an example of first and second uplink beams corresponding to FIG. 3A, according to an embodiment.
Figure 3A:
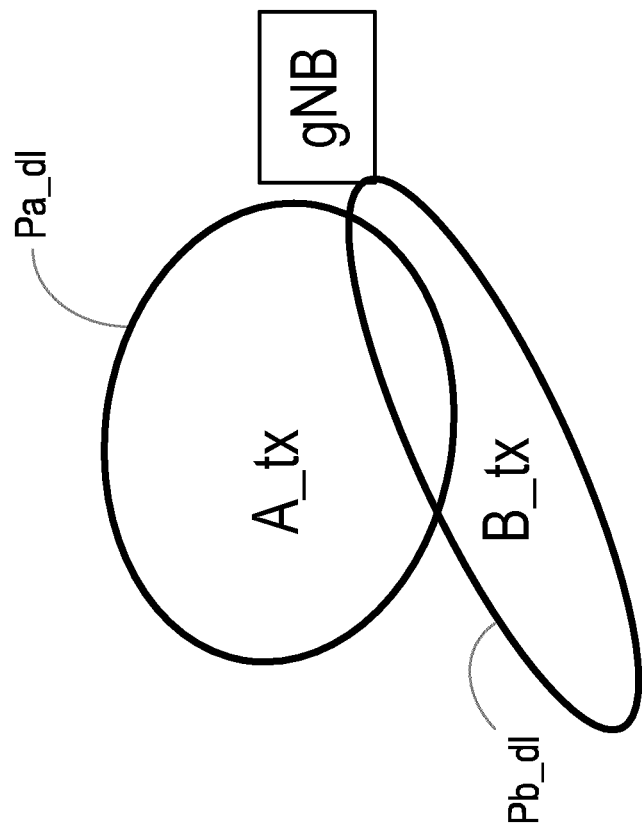
FIG. 3A shows an example of first and second downlink beams according to an embodiment.

FIG. 3A shows an example of first and second beamformer profiles A_tx and B_tx in a downlink, whereas FIG. 3B shows an example of corresponding first and second beamformer profiles A_rx, B_rx in an uplink.

Figure 4B:
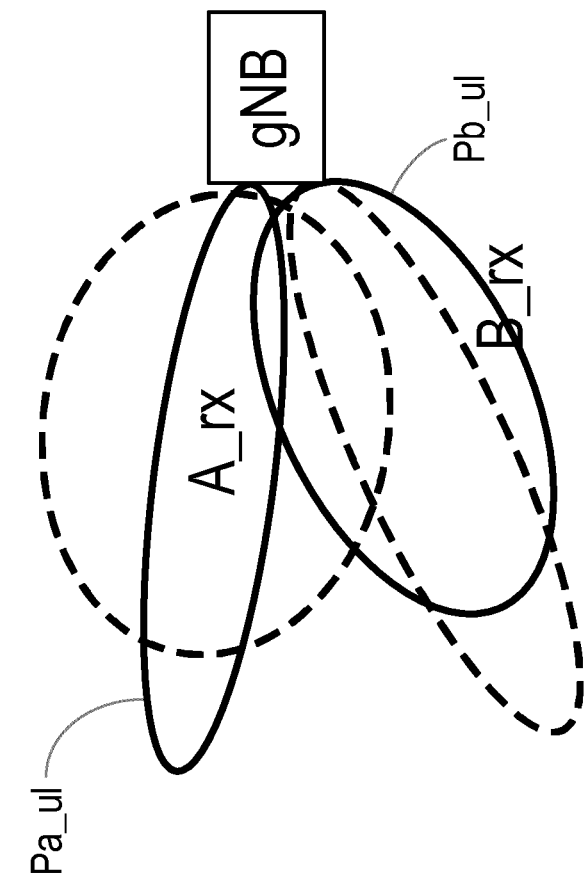
FIG. 4B shows an example of first and second uplink beams corresponding to FIG. 4A, according to the other embodiment.
Figure 4A:
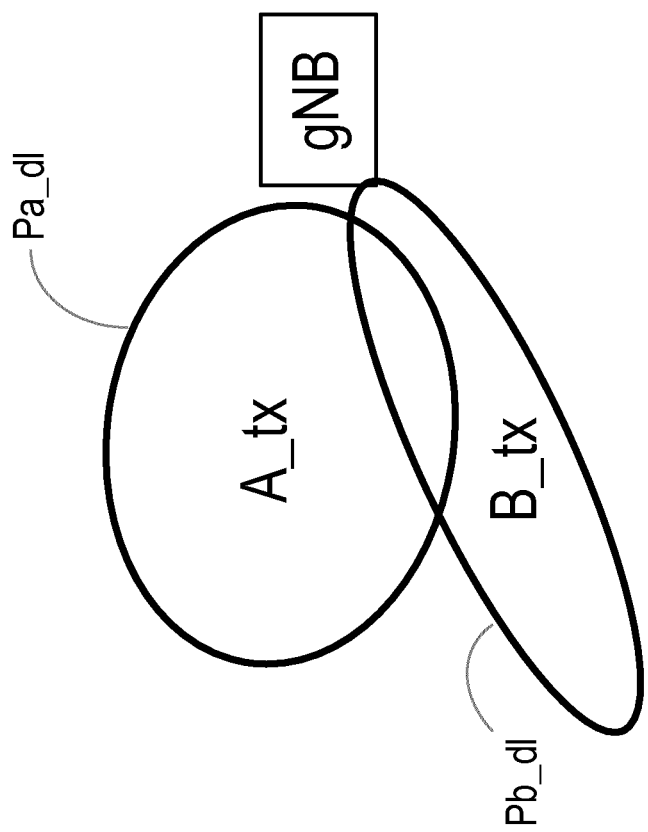
FIG. 4A shows an example of first and second downlink beams according to another embodiment.

Likewise, FIG. 4A shows an example of first and second beamformer profiles A_tx and B_tx in a downlink, whereas FIG. 4B shows an example of corresponding first and second beamformer profiles A_rx and B_rx in an uplink.

In particular, FIGS. 3A/3B and FIGS. 4A/4B, illustrate examples of where the first downlink beamformer, for example having beamforming weights Pa_dl, for transmitting the first downlink reference signal (Pilot A) comprises a first downlink beamforming profile A_tx, and wherein the second downlink beamformer, for example having beamforming weights Pb_dl, for transmitting the second downlink reference signal (Pilot B) comprises a second downlink beamforming profile B_tx.

FIGS. 3A/3B and FIGS. 4A/4B also illustrate examples of where the first uplink beamformer, for example having beamforming weights Paul, for transmitting a first uplink signal comprises a first uplink beamforming profile A_rx, and where the second uplink beamformer, for example having beamforming weights Pb_ul, for transmitting the second uplink signal comprises a second uplink beamforming profile B_rx.

The examples of FIGS. 3A/3B and FIGS. 4A/4B illustrate the first downlink beamforming profile A_tx being different to the second downlink beamforming profile B_tx. It is noted, however, that in other examples the first and second downlink beamformer profiles A_tx and B_tx may be the same or similar.

FIGS. 3A and 3B show an example wherein the first and second downlink beamformer profiles, A_tx, B_tx, are substantially the same as corresponding first and second uplink beamformer profiles, A_rx, B_rx, used to transmit on the first uplink channel and second uplink channel, respectively.

For example, first and second downlink beamformer profiles, A_tx, B_tx, may have substantially the same gain and/or beam width and/or directivity as the corresponding first and second uplink beamformer profiles, A_rx, B_rx, respectively.

In the examples of FIGS. 3A/3B and 4A/4B it can be seen that the first and second downlink beamformer profiles A_tx, B_tx, spatially overlap at least partially with the corresponding first and second uplink beamformer profiles, A_rx, B_rx, respectively.

FIGS. 3A and 3B show an example where the first uplink beamformer profile A_rx (Pa_ul) of FIG. 3B overlaps fully with the corresponding first downlink beamformer profile A_tx (Pa_dl) of FIG. 3A.

FIGS. 3A and 3B also show an example where the second uplink beamformer profile B_rx (Pb_ul) overlaps fully with the corresponding second downlink beamformer profile B_tx (Pb_dl) of FIG. 3A.

In some embodiments the spatial overlap is mainly relevant between corresponding beamformers on the uplink and downlink, although it is noted that in some examples the spatial overlap may also be at least partly relevant between first and second downlink beamformers, and/or first and second uplink beamformers.

The beamformer profiles may be directional, and in FIGS. 4A and 4B there is shown an example where one of the beamformer profiles in the downlink is wider and has a smaller gain compared to a corresponding beamformer profile in an uplink. For example, in FIG. 4A the beamformer profile A_tx in a downlink is wider and has a smaller gain compared to a corresponding beamformer profile A_rx in an uplink, as shown in FIG. 4B.

FIGS. 4A and 4B also show an example where the other of the beamformer profiles in the downlink is narrower and has a larger gain compared to a corresponding beamformer profile in an uplink. For example, in FIG. 4A the beamformer profile B_tx in a downlink is narrower and has a larger gain compared to a corresponding beamformer profile B_rx in an uplink, as shown in FIG. 4B.

In some embodiments the gNB compensates for the difference in beamforming gain in the corresponding beamformer, for example based on an expected beamforming gain. This compensation may, for example, be fixed as a parameter, or may be learnt by the system based on monitoring the actual quality in the second receive beam.

According to some embodiments, the method of FIGS. 1 and 2 may therefore further comprise compensating for any gain or other difference between a first or second downlink beamformer profile and a corresponding first or second uplink beamformer profile using a compensating factor, for example illustrated as step 105 in FIG. 1.

In some examples the step of compensating may comprise using a fixed parameter as the compensating factor. In other examples, the step of compensating may comprise learning a compensating factor based on monitoring an actual channel quality in the second uplink channel.

As mentioned earlier, the received measurement report $REP_{AB}$ may comprise a reference signal received power, RSRP, value, for example representing an estimated received power. In such embodiments, according to one example the compensating factor is based on a difference in RSRP between the first downlink reference signal and the second downlink reference signal.

In some embodiments a more complex compensation function can be employed, e.g. based on known or estimated errors such as estimation errors dependent on the RSRP value. Thus, in another example of such an embodiment, the compensation factor is based on a known or estimated error dependent on the RSRP value.

In some embodiments, truncation and quantization effects are taken into account. In an example of such an embodiment the compensation factor is based on rounding to a next higher or lower value to compensate for the received measurement report $REP_{AB}$ being in discrete steps.

As also mentioned earlier, the received measurement report $REP_{AB}$ may comprises a channel quality indicator, CQI, value. In such embodiments, according to one example the compensating factor is derived from the CQI value. In another example of such an embodiment the compensation factor is based on a signal-to-interference-plus-noise-ratio, SINR, estimate derived using a transfer function of the CQI value. In another example of such an embodiment the compensation factor is based on rounding to a next higher or lower value to compensate for the received measurement report $REP_{AB}$ being in discrete steps.

In embodiments described herein, the step of determining at least one transmission parameter for a future second uplink channel may be performed when switching from a first uplink beamformer to a second uplink beamformer. It is noted that the at least one transmission parameter may comprise any form of transmission parameter relating to an uplink transmission, including for example transmission power or gain, beam width of an uplink beamformer, or other parameters.

In other embodiments, the step of determining at least one transmission parameter for a future second uplink channel may be performed where an uplink measurement in the second uplink channel is available but not fully reliable. Such embodiments are therefore applicable also for cases where an uplink measurement in the target beam is available but not fully reliable, e.g. due to age or accuracy in the measurement.

Determining at least one transmission parameter for a future second uplink channel may comprise determining a channel estimate of the second uplink channel. In some examples determining a channel estimate of the second uplink channel may be based on a combination of a first estimate value relating to measurements taken in the second uplink channel, and a second estimate value derived from measurements taken in the first uplink channel, whereby an expected accuracy of each of the first estimate value and second estimate value is used to weight an overall channel estimate value of the second uplink channel. In such embodiments an estimated value can be merged with the value produced by the embodiments described herein, dependent on the expected accuracy of each method.

Figure 5:
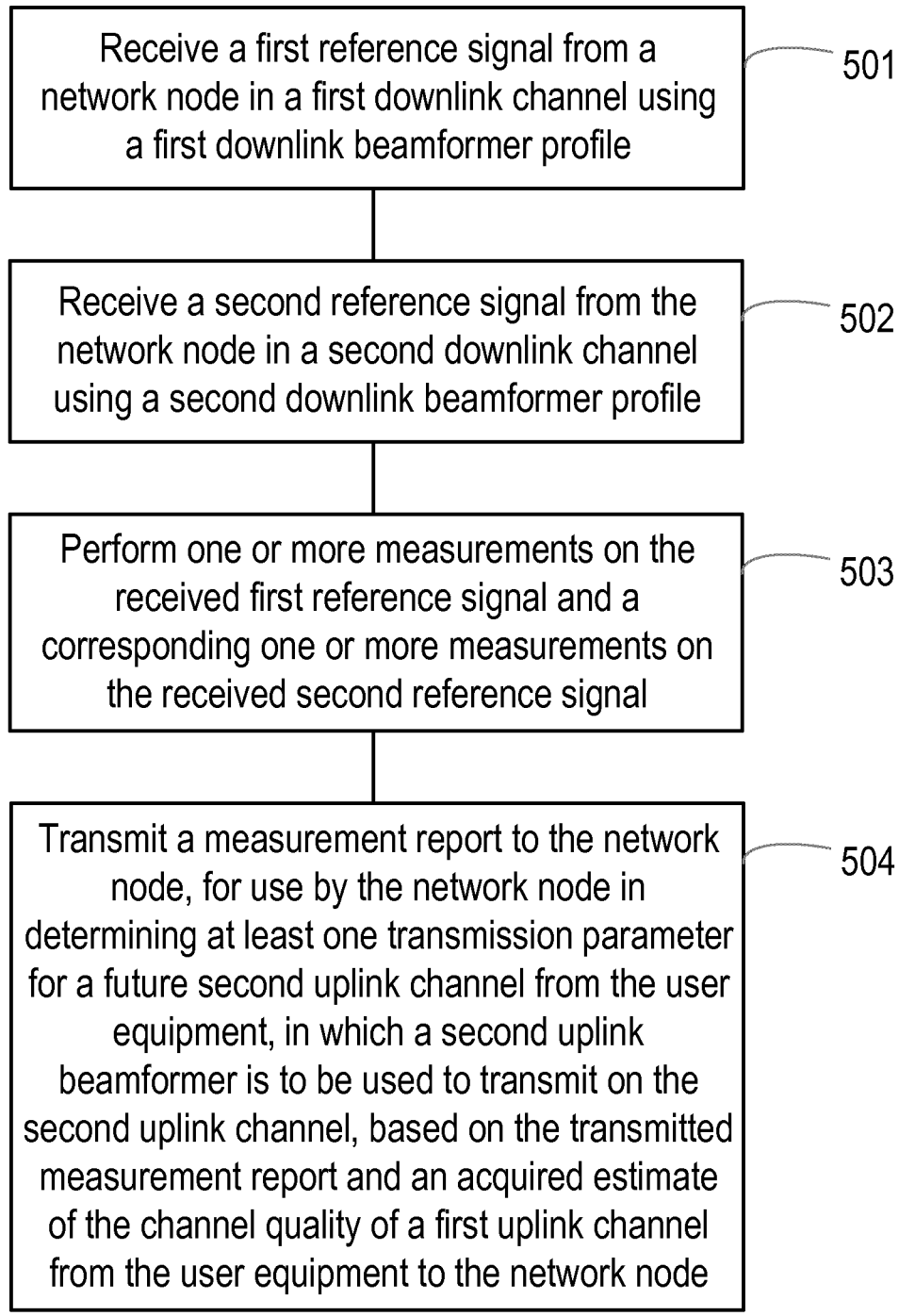
FIG. 5 shows an example of a method performed in a user equipment, according to an embodiment.

FIG. 5 shows an example of the steps that may be performed by a method carried out in a user equipment. The method comprises receiving a first reference signal (Pilot A) from a network node in a first downlink channel using a first downlink beamformer profile (e.g. Pa_dl), step 501.

The method comprises receiving a second reference signal (Pilot B) from the network node in a second downlink channel using a second downlink beamformer profile (e.g. Pb_dl), step 502.

The method comprises performing one or more measurements on the received first reference signal (Pilot A) and a corresponding one or more measurements on the received second reference signal (Pilot B), step 503.

The method comprises transmitting a measurement report ($REP_{AB}$) to the network node, step 504, for use by the network node in determining at least one transmission parameter for a future second uplink channel from the user equipment, in which a second uplink beamformer (Pb_ul/Pa_ul) is to be used to transmit on the second uplink channel, based on the transmitted measurement report and an acquired estimate of the channel quality of a first uplink channel from the user equipment to the network node.

In some examples the step of transmitting, step 504, comprises transmitting a separate measurement report for the one or more measurements on the respective first reference signal and second reference signal, for example whereby a comparison or correlation is then made at a gNB or elsewhere.

In other examples, the step of transmitting, step 504, comprises transmitting a measurement report that comprises a correlation between a measurement made on the first reference signal and a measurement made on the second reference signal. In such an embodiment the user equipment may be operative to perform a correlation between a measurement made on a first reference signal and a measurement made on a second reference signal, and transmit a measurement report that comprises the correlation between the measurement made on the first reference signal and the measurement made on the second reference signal.

Figure 6:
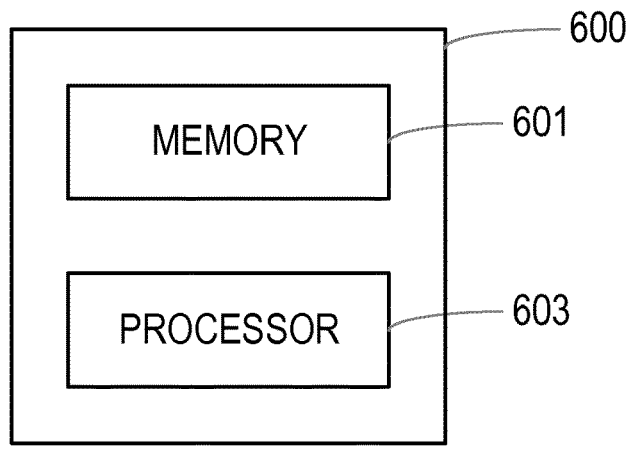
FIG. 6 shows an example of a user equipment according to an embodiment.

FIG. 6 shows an example of a user equipment 600 according to an embodiment, comprising a processor 601 and a memory 603. The memory 603 contains instructions executable by said processor 601.

The user equipment 600 is operative to receive a first reference signal (Pilot A) from a network node in a first downlink channel using a first downlink beamformer profile (Pa_dl). The user equipment 600 is operative to receive a second reference signal (Pilot B) from the network node in a second downlink channel using a second downlink beamformer profile (Pb_dl). The user equipment 600 is operative to perform one or more measurements on the received first reference signal (Pilot A) and a corresponding one or more measurements on the received second reference signal (Pilot B). The user equipment 600 is operative to transmit a measurement report ($REP_{AB}$) to the network node, for use by the network node in determining at least one transmission parameter for a future second uplink channel from the user equipment, in which a second uplink beamformer (Pb_ul/Pa_ul) is to be used to transmit on the second uplink channel, based on the transmitted measurement report and an acquired estimate of the channel quality of a first uplink channel from the user equipment to the network node.

In a similar manner to above, is some examples the user equipment is operative to transmit a separate measurement report for the one or more measurements on the respective first reference signal and second reference signal, e.g. as separate measurement reports over the air interface, for example whereby a comparison or correlation is then made at a gNB or elsewhere. In other examples, the user equipment is operative to perform a correlation between a measurement made on the first reference signal and a measurement made on the second reference signal, and transmit a measurement report that comprises the correlation between the measurement made on the first reference signal and the measurement made on the second reference signal.

Figure 7:
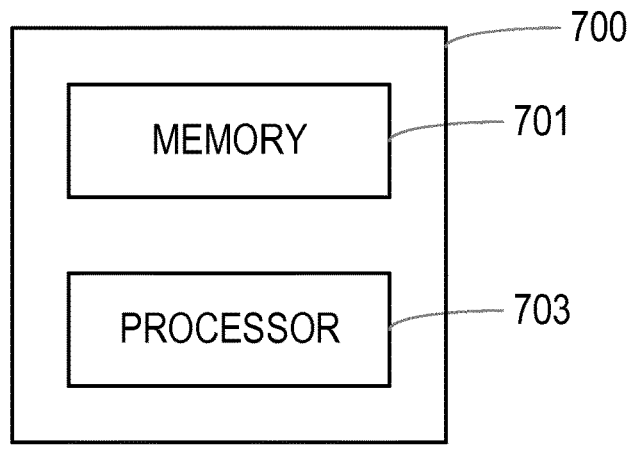
FIG. 7 shows an example of a network node according to an embodiment.

FIG. 7 shows an example of a network node 700 comprising a processor 701 and a memory 703, said memory 703 containing instructions executable by said processor 701.

The network node 700 is operative to receive a measurement report ($REP_{AB}$) from a user equipment, wherein the measurement report is based on at least one measurement made by the user equipment on a first downlink reference signal (Pilot A) previously transmitted to the user equipment using a first downlink beamformer (e.g. Pa_dl) and at least one measurement made by the user equipment on a second downlink reference signal (Pilot B) previously transmitted to the user equipment using a second downlink beamformer (e.g. Pb_dl).

The network node 700 is operative to acquire an estimate of a channel quality of a first uplink channel from the user equipment, in which a first uplink beamformer (Pa_ul/Pb_ul) has been used to transmit a first uplink signal on the first uplink channel.

The network node 700 is operative to determine at least one transmission parameter for a future second uplink channel from the user equipment, in which a second uplink beamformer (Pb_ul/Pa_ul) is to be used to transmit on the second uplink channel, based on the received measurement report and the acquired estimate of the channel quality of the first uplink channel.

The network node 700 is further operative to perform the method according to any one of the embodiments described herein, and defined in the appended claims.

Figure 8:
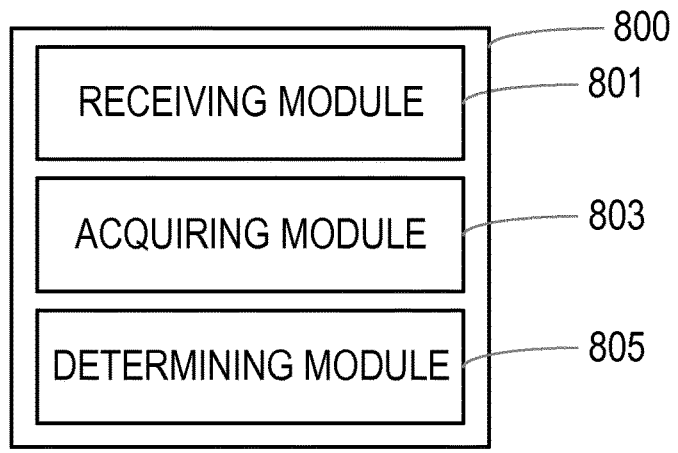
FIG. 8 shows an example of a network node according to another embodiment.

FIG. 8 shows an example of a network node 800 comprising a receiving module 801, an acquiring module 803 and a determining module 805.

The receiving module 801 is adapted to receive a measurement report ($REP_{AB}$) from a user equipment, wherein the measurement report is based on at least one measurement made by the user equipment on a first downlink reference signal (Pilot A) previously transmitted to the user equipment using a first downlink beamformer (e.g. Pa_dl) and at least one measurement made by the user equipment on a second downlink reference signal (Pilot B) previously transmitted to the user equipment using a second downlink beamformer (e.g. Pb_dl).

The acquiring module 803 is operative to acquire an estimate of a channel quality of a first uplink channel from the user equipment, in which a first uplink beamformer (Pa_ul/Pb_ul) has been used to transmit a first uplink signal on the first uplink channel.

The determining module 803 is operative to determine at least one transmission parameter for a future second uplink channel from the user equipment, in which a second uplink beamformer (Pb_ul/Pa_ul) is to be used to transmit on the second uplink channel, based on the received measurement report and the acquired estimate of the channel quality of the first uplink channel.

The network node 800 is further operative to perform the method according to any one of the embodiments described herein, and defined in the appended claims.

According to another aspect there is provided a computer program comprising instructions which, when executed on at least one processor, cause the at least one processor to carry out the method according to any one of the embodiments described herein, and as defined in the appended claims.

According to another aspect, there is also provided a computer program product comprising a computer-readable medium with the computer program as described above.

It is noted that the estimation of the channel quality, the processing of a received measurement report, the computation of a compensation term and the computation of a transmission parameter, as described herein, can each be performed in the same physical node, or performed in one or more separate physical nodes.

Figure 9:
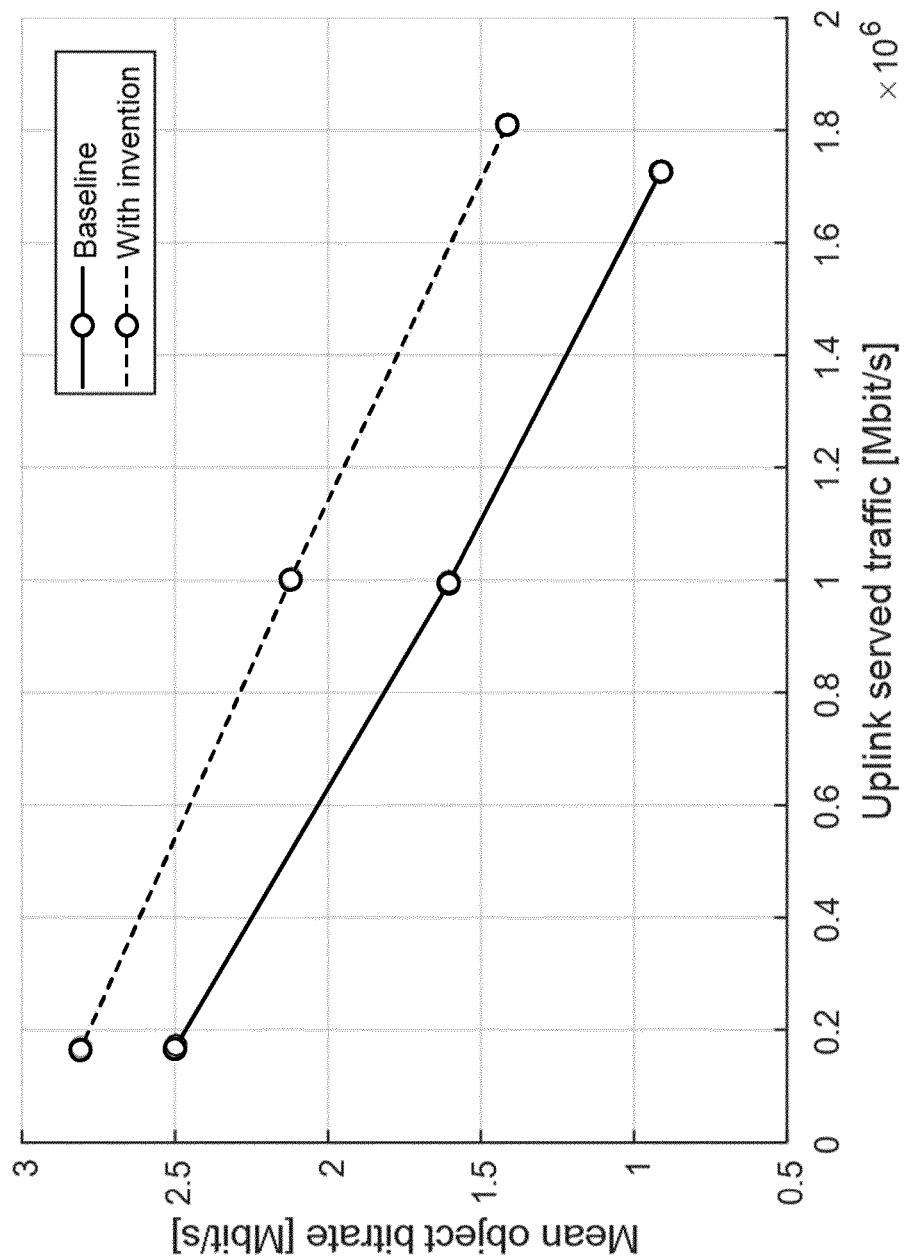
FIG. 9 illustrates a comparison of results using the embodiments and without.

FIG. 9 illustrates a comparison of results using the embodiments and without, whereby a baseline mean object bitrate of uplink served traffic without using the embodiments described herein is compared with that when using the embodiments. As can be seen, the mean object bitrate is increased when using the embodiments described herein, for all values of uplink served traffic.

Figure 10:
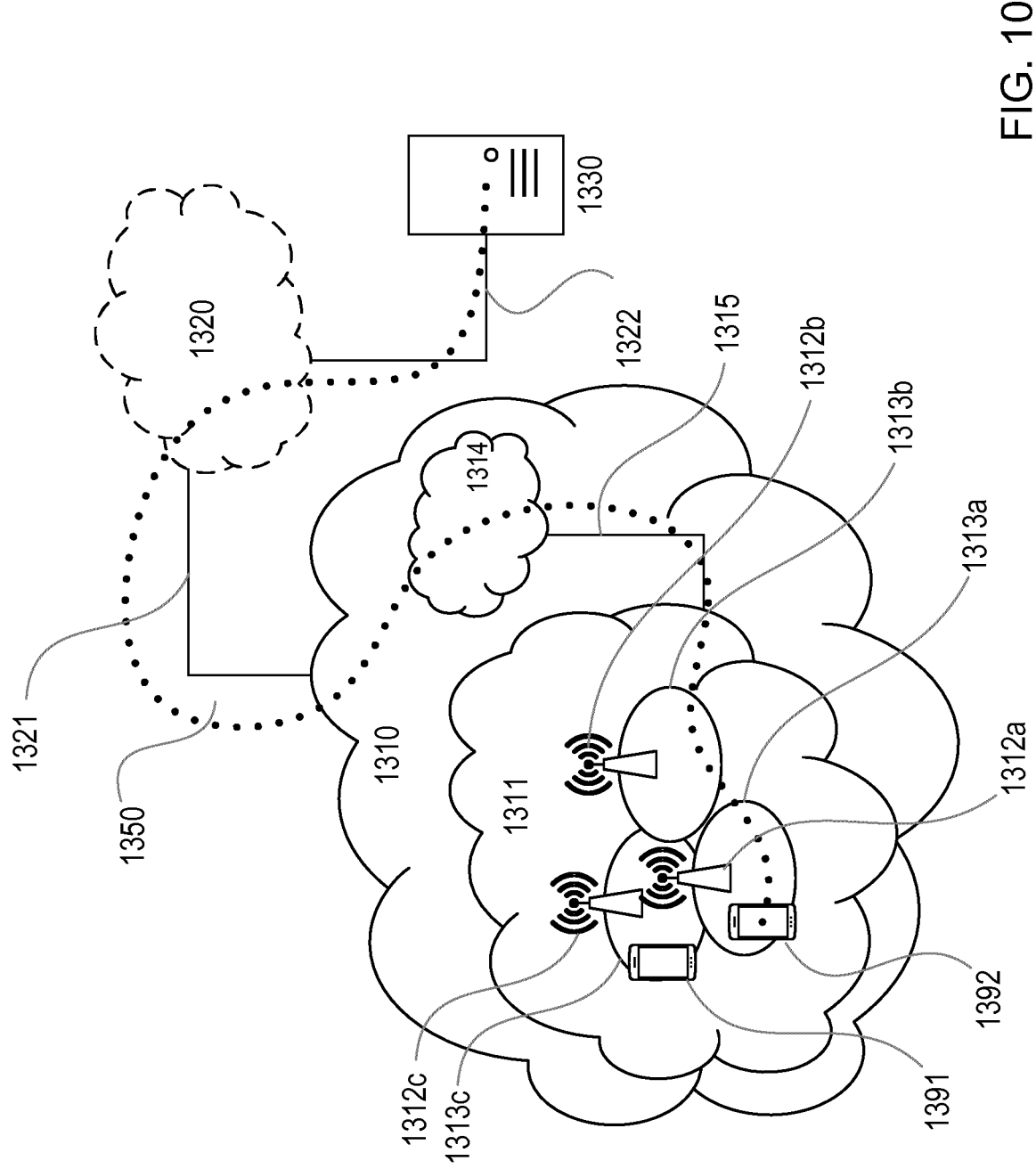
FIG. 10 illustrates a telecommunication network connected via an intermediate network to a host computer in accordance with some embodiments.

FIG. 10 illustrates a telecommunication network connected via an intermediate network to a host computer in accordance with some embodiments.

With reference to FIG. 10, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 10 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 11:
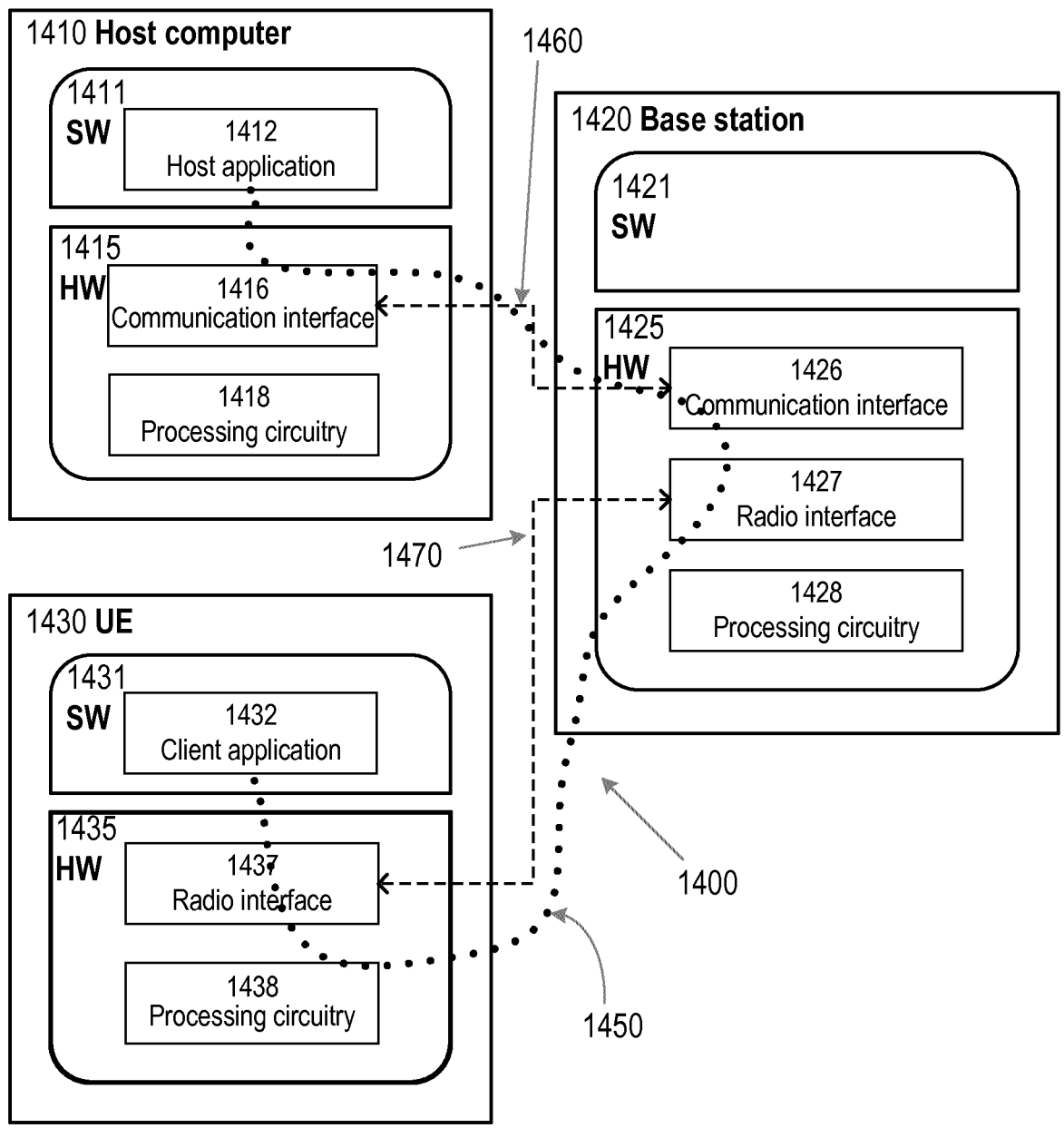
FIG. 11 illustrates a host computer communicating via a base station with a user equipment over a partially wireless connection in accordance with some embodiments.

FIG. 11 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 11) served by base station 1420. Communication interface 1426 may be configured to facilitate connection 1460 to host computer 1410. Connection 1460 may be direct or it may pass through a core network (not shown in FIG. 11) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 11 may be similar or identical to host computer 1330, one of base stations 1312*a*, 1312*b*, 1312*c* and one of UEs 1391, 1392 of FIG. 10, respectively. This is to say, the inner workings of these entities may be as shown in FIG. 11 and independently, the surrounding network topology may be that of FIG. 10.

In FIG. 11, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 12:
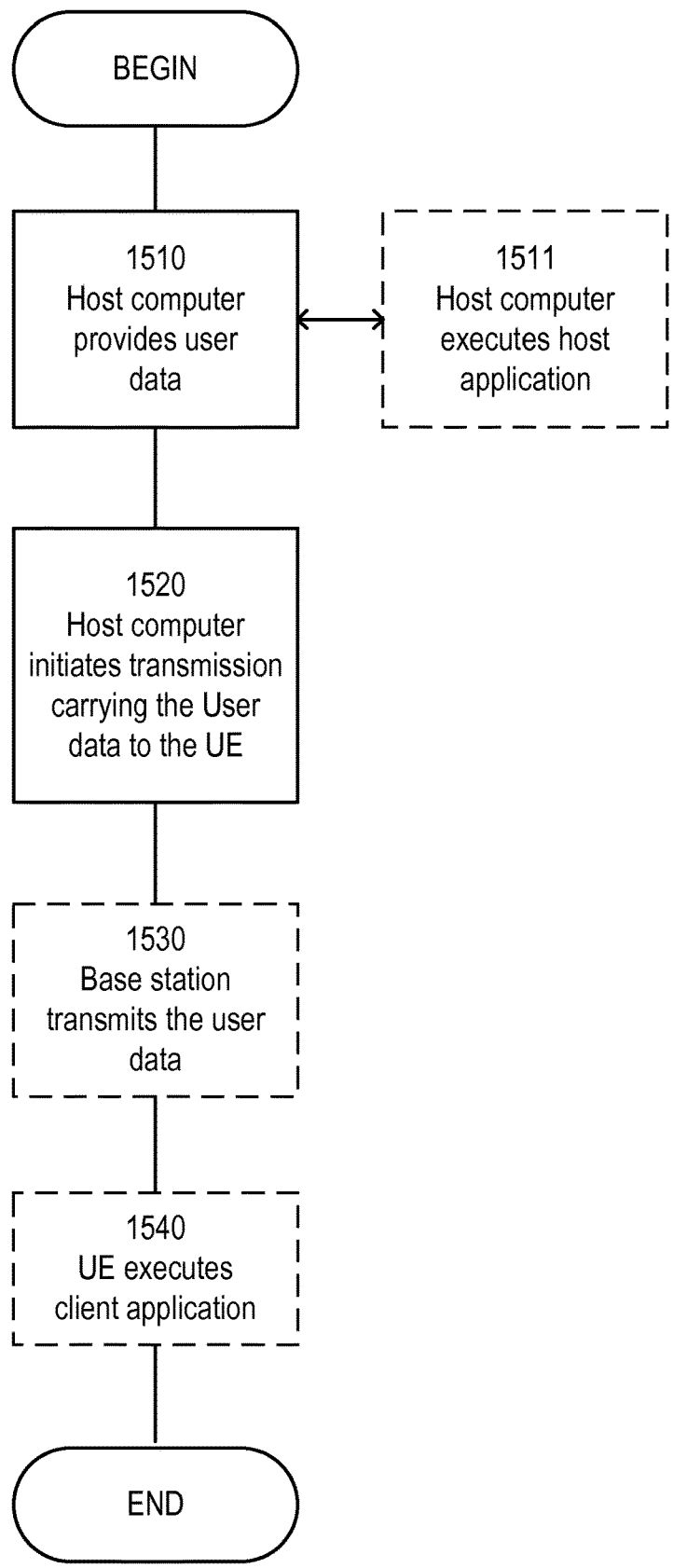
FIG. 12 illustrates methods implemented in a communication system including a host computer, a base station and a user equipment in accordance with some embodiments.

FIG. 12 illustrates methods implemented in a communication system including a host computer, a base station and a user equipment in accordance with some embodiments. FIG. 12 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 12 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 13:
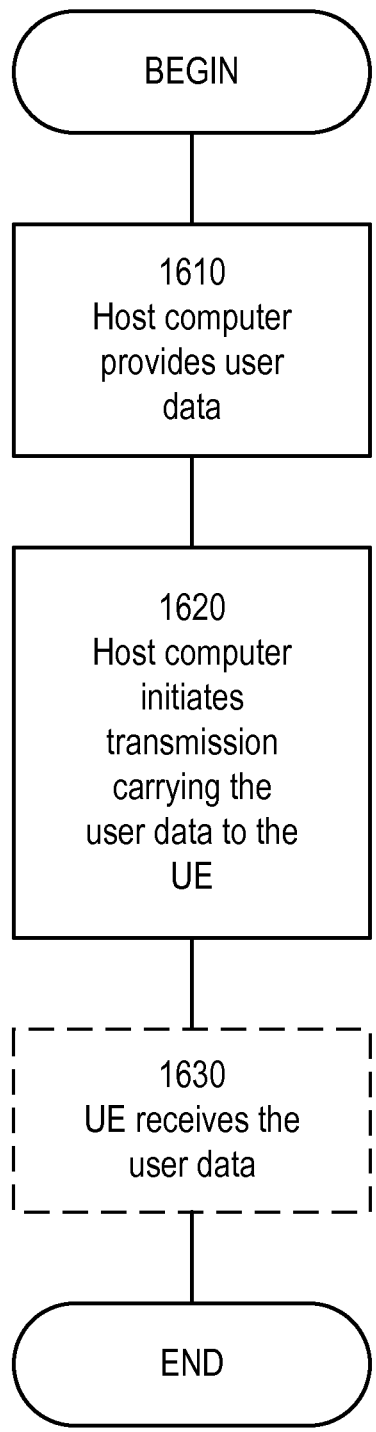
FIG. 13 illustrates methods implemented in a communication system including a host computer, a base station and a user equipment in accordance with some embodiments.

FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 14:
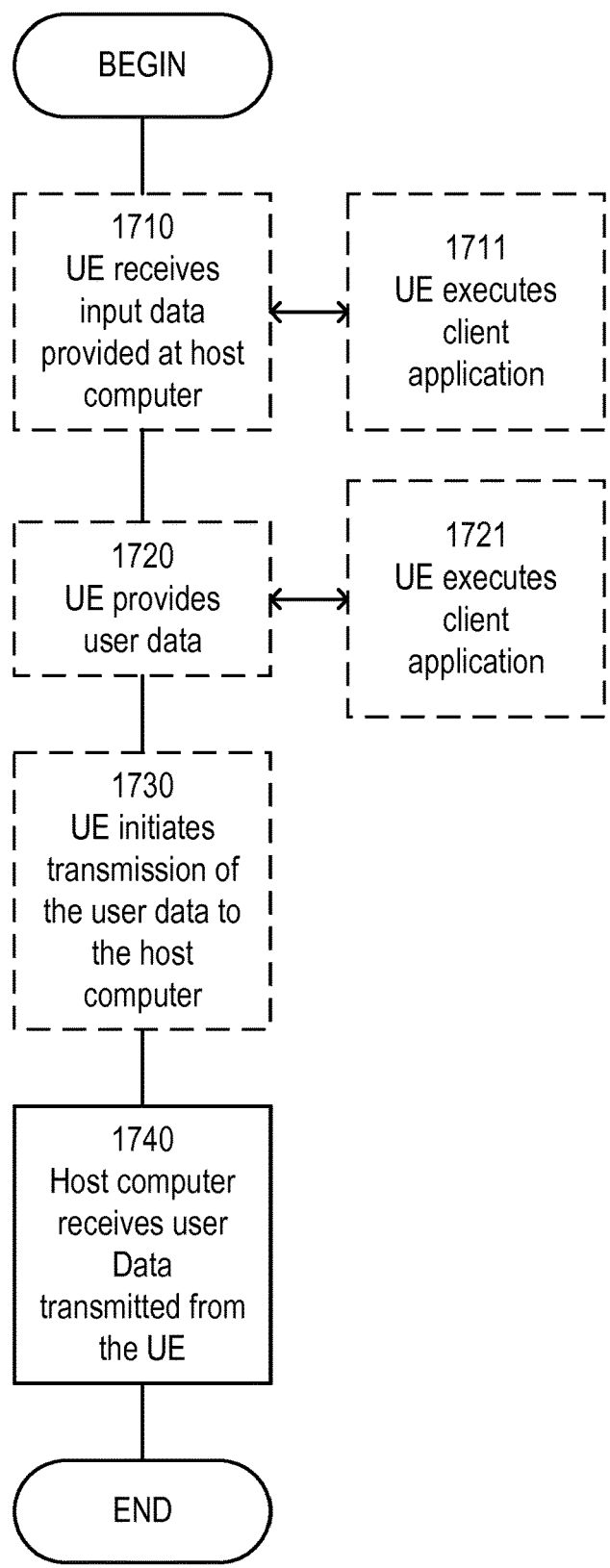
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 15:
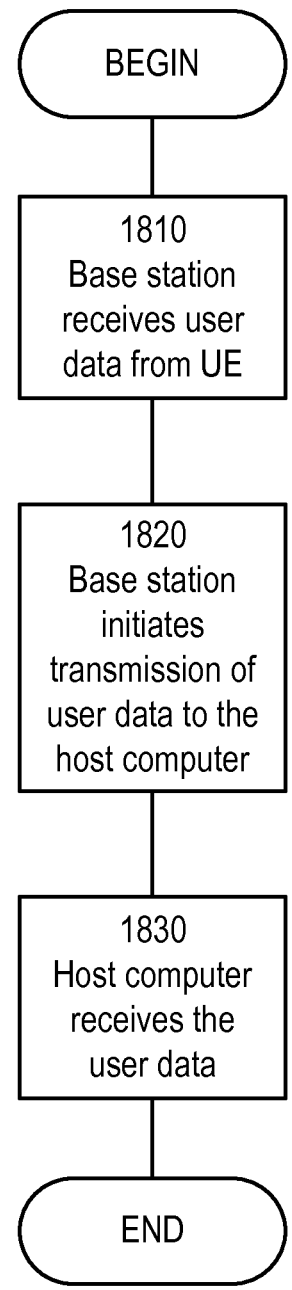
FIG. 15 illustrates methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a base station, of estimating a channel quality of an uplink channel from a user equipment, the method comprising:
    receiving a measurement report from a user equipment, wherein the measurement report is based on at least a first measurement made by the user equipment on a first downlink reference signal previously transmitted to the user equipment using a first downlink beamformer and at least a second measurement made by the user equipment on a second downlink reference signal previously transmitted to the user equipment using a second downlink beamformer;
    acquiring an estimate of a channel quality of a first uplink channel from the user equipment, in which a first uplink receiver beamformer has been used to receive a first uplink signal on the first uplink channel; and
    determining at least one transmission parameter for a future second uplink channel from the user equipment, in which a second uplink receiver beamformer is to be used to receive on the second uplink channel, wherein the at least one transmission parameter is determined based on a comparison or correlation between the first and the second measurements received in the measurement report and the acquired estimate of the channel quality of the first uplink channel.

2. A method as claimed in claim 1, wherein the step of determining at least one transmission parameter comprises estimating an expected channel quality of the second uplink channel from the user equipment.

3. A method as claimed in claim 1, in which the first downlink beamformer for transmitting the first downlink reference signal comprises a first downlink beamforming profile, and wherein the second downlink beamformer for transmitting the second downlink reference signal comprises a second downlink beamforming profile and the comparison or correlation between the first and second measurements is based on one of the following:
    the first and second downlink beamformer profiles are substantially the same as corresponding first and second uplink beamformer profiles used to transmit on the first uplink channel and second uplink channel;
    the first and second downlink beamformer profiles have substantially the same gain and/or beam width and/or directivity as the corresponding first and second uplink beamformer profiles;
    the first and second downlink beamformer profiles spatially overlap at least partially with the corresponding first and second uplink beamformer profiles;
    the first uplink beamformer profile overlaps fully with the corresponding first downlink beamformer profile, and/or wherein the second uplink beamformer profile overlaps fully with the corresponding second downlink beamformer profile;

the beamformer profiles are directional, and wherein:
- a beamformer profile in a downlink is wider and has a smaller gain compared to a corresponding beamformer profile in an uplink; or
- a beamformer profile in a downlink is narrower and has a larger gain compared to a corresponding beamformer profile in an uplink.

4. A method as claimed in claim 3, further comprising:
compensating for any gain difference between a first or second downlink beamformer profile and a corresponding first or second uplink beamformer profile using a compensating factor.

5. A method as claimed in claim 4, wherein the step of compensating comprises:
- using a fixed parameter as the compensating factor; or
- learning a compensating factor based on monitoring an actual channel quality in the second uplink channel.

6. A method as claimed in claim 4, wherein the received measurement report comprises a reference signal received power (RSRP) value and wherein:
- the compensating factor is based on a difference in RSRP between the first downlink reference signal and the second downlink reference signal; or
- the compensation factor is based on a known or estimated error dependent on the RSRP value; or
- the compensation factor is based on rounding to a next higher or lower value to compensate for the received measurement report being in discrete steps.

7. A method as claimed in claim 4, wherein the received measurement report comprises a channel quality indicator (CQI) value, and wherein:
- the compensating factor is derived from the CQI value; or
- the compensation factor is based on a signal-to-interference-plus-noise-ratio (SINR) estimate derived using a transfer function of the CQI value; or
- the compensation factor is based on rounding to a next higher or lower value to compensate for the received measurement report (REPAB) being in discrete steps.

8. A method as claimed in claim 1, wherein the first uplink signal comprises:
- an uplink sounding signal; or
- a physical random access channel preamble signal; or
- a demodulation pilot signal.

9. A method as claimed in claim 1, wherein determining at least one transmission parameter for a future second uplink channel is performed:
- when switching from a first uplink beamformer to a second uplink beamformer; or
- where an uplink measurement in the second uplink channel is available but not fully reliable.

10. A method as claimed in claim 2, further comprising determining one or more transmission parameters for the second uplink channel based on the estimated channel quality of the second uplink channel.

11. A method performed by a user equipment comprising:
- receiving a first reference signal from a network node in a first downlink channel using a first downlink beamformer profile;
- receiving a second reference signal from the network node in a second downlink channel using a second downlink beamformer profile;
- performing at least a first measurement on the received first reference signal and a corresponding at least a second measurement on the received second reference signal; and
- transmitting a measurement report to the network node, for use by the network node in determining at least one transmission parameter for a future second uplink channel from the user equipment, in which a second uplink beamformer is to be used to receive on the second uplink channel, based on a comparison or correlation between the first and the second measurements transmitted in the measurement report and an acquired estimate of the channel quality of a first uplink channel from the user equipment to the network node.

12. A method as claimed in claim 11 comprising:
performing a correlation between a measurement made on a first reference signal and a measurement made on a second reference signal, and transmitting a measurement report that comprises the correlation between the measurement made on the first reference signal and the measurement made on the second reference signal.

13. A user equipment comprising a processor and a memory, said memory containing instructions executable by said processor, whereby said user equipment is operative to:
- receive a first reference signal from a network node in a first downlink channel using a first downlink beamformer profile;
- receive a second reference signal from the network node in a second downlink channel using a second downlink beamformer profile;
- perform at least a first measurement on the received first reference signal and a corresponding at least a second measurement on the received second reference signal; and
- transmit a measurement report to the network node, for use by the network node in determining at least one transmission parameter for a future second uplink channel from the user equipment, in which a second uplink beamformer is to be used to receive on the second uplink channel, based on a comparison or correlation between the first and the second measurements transmitted in the measurement report and an acquired estimate of the channel quality of a first uplink channel from the user equipment to the network node.

14. A network node comprising a processor and a memory, said memory containing instructions executable by said processor, whereby said network node is operative to:
- receive a measurement report from a user equipment, wherein the measurement report is based on at least a first measurement made by the user equipment on a first downlink reference signal previously transmitted to the user equipment using a first downlink beamformer and at least a second measurement made by the user equipment on a second downlink reference signal previously transmitted to the user equipment using a second downlink beamformer;
- acquire an estimate of a channel quality of a first uplink channel from the user equipment, in which a first uplink beamformer has been used to transmit a first uplink signal on the first uplink channel; and
- determine at least one transmission parameter for a future second uplink channel from the user equipment, in which a second uplink beamformer is to be used to transmit on the second uplink channel, based on a comparison or correlation between the first and the second measurements received in the measurement report and the acquired estimate of the channel quality of the first uplink channel.

15. A network node as claimed in claim 14, wherein the network node is further operative to determine at least one transmission parameter by estimating an expected channel quality of the second uplink channel from the user equipment.

16. A non-transitory computer readable storage medium comprising instructions which, when executed on at least one processor, cause the at least one processor to carry out a method performed by a base station, of estimating a channel quality of an uplink channel from a user equipment, the method comprising:
   receiving a measurement report from a user equipment, wherein the measurement report is based on at least a first measurement made by the user equipment on a first downlink reference signal previously transmitted to the user equipment using a first downlink beamformer and at least a second measurement made by the user equipment on a second downlink reference signal previously transmitted to the user equipment using a second downlink beamformer;
   acquiring an estimate of a channel quality of a first uplink channel from the user equipment, in which a first uplink receiver beamformer has been used to receive a first uplink signal on the first uplink channel; and
   determining at least one transmission parameter for a future second uplink channel from the user equipment, in which a second uplink receiver beamformer is to be used to receive on the second uplink channel, wherein the at least one transmission parameter is determined based on a comparison or correlation between the first and the second measurements received in the measurement report and the acquired estimate of the channel quality of the first uplink channel.

* * * * *